Sept. 24, 1968

A. P. HARDISON 3,402,732

LIQUID LEVEL AND PRESSURE CONTROL SYSTEM
WITH PRECHECK MEANS FOR TANKS

Filed June 7, 1966

Artson P. Hardison
INVENTOR.

WHANN & McMANIGAL
Attorneys for Applicant

Sept. 24, 1968  A. P. HARDISON  3,402,732
LIQUID LEVEL AND PRESSURE CONTROL SYSTEM
WITH PRECHECK MEANS FOR TANKS
Filed June 7, 1966  2 Sheets-Sheet 2
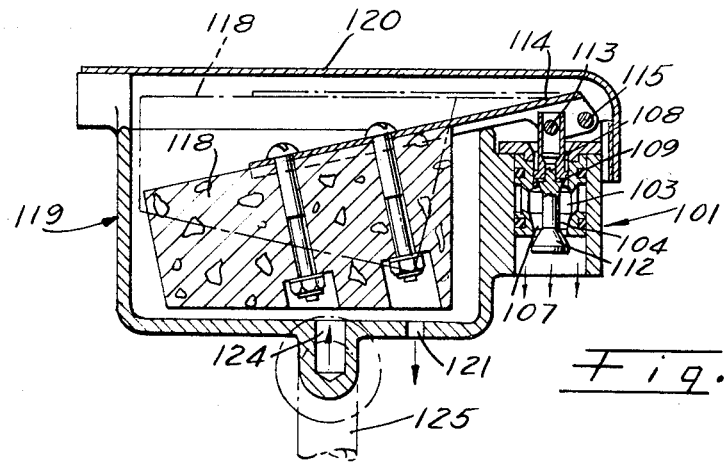
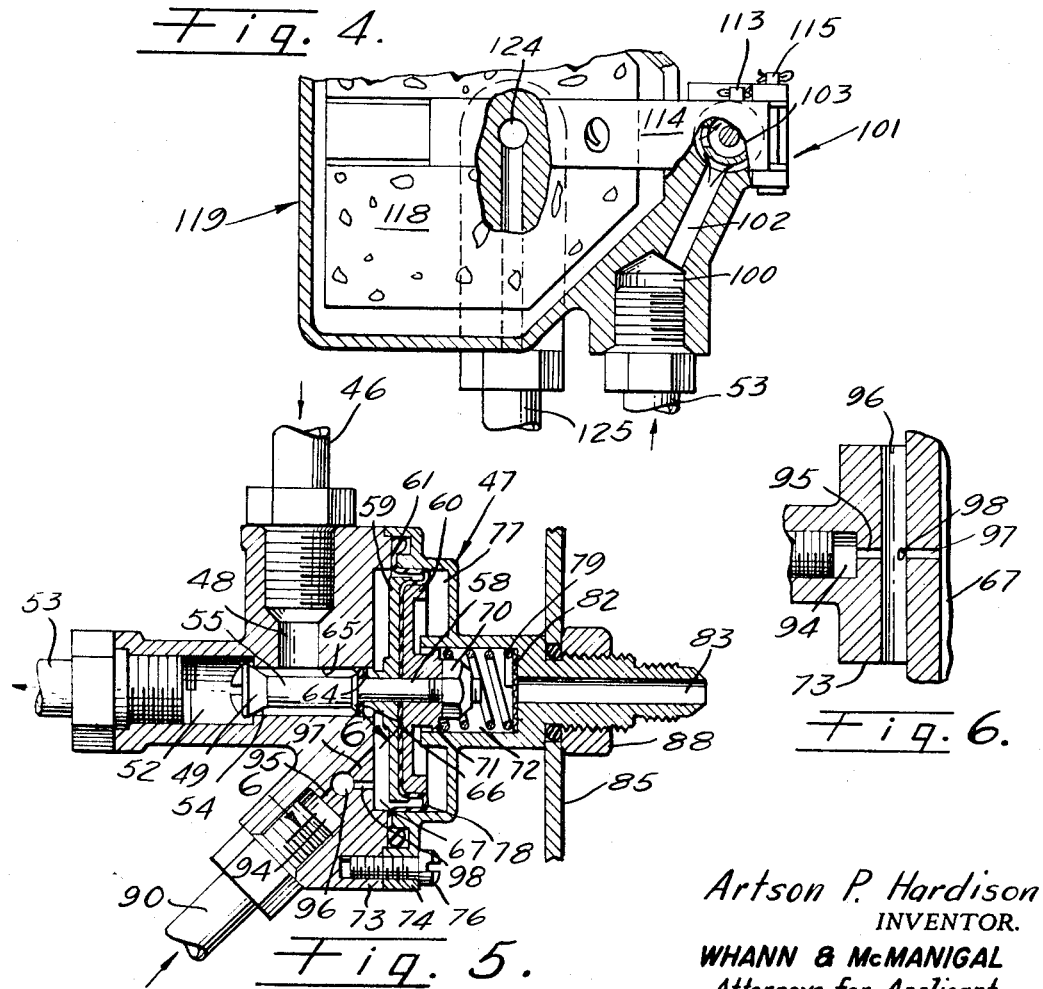
Artson P. Hardison
INVENTOR.
WHANN & McMANIGAL
Attorneys for Applicant

# United States Patent Office 3,402,732
Patented Sept. 24, 1968

3,402,732
LIQUID LEVEL AND PRESSURE CONTROL SYSTEM
WITH PRECHECK MEANS FOR TANKS
Artson P. Hardison, Glendora, Calif., assignor to Schulz
Tool and Manufacturing Co., San Gabriel, Calif., a corporation of California
Filed June 7, 1966, Ser. No. 555,889
13 Claims. (Cl. 137—390)

This invention relates to a tank level and pressure sensing control system in which liquid from a pressurized supply is fed into the tank and in which the liquid level and pressure control may be prechecked.

Tank liquid level and pressure control systems are typically used in aircraft fuel tanks, particularly during fueling operations. Prior art systems have used relief valves to sense and relieve excessive pressure, but these are expensive and also, are subject to failure. Aircraft fuel tanks have vent valves which are subject to failing closed so as to not be reliable for relieving excessive pressure within a tank. In addition, it is very undesirable to rely upon vent valves to relieve excessive fuel pressure from tanks for obvious reasons. Moreover, vents for fuel tanks are made as small as possible to prevent excessive weight and as a result their size is not adequate to relieve excessive fuel pressure from a tank without preventing damage to the tank.

The present invention includes a new precheck means for a pressure sensitive valve and further includes a new system in which there is a main fueling valve in combination with a pressure sensitive valve and a liquid level control valve, each of the valves in the system having a means for being prechecked during or prior to fueling operations. The main valve is a normally closed valve which is opened by line pressure and which is closed by action of the liquid level pilot valve when the fuel in the tank reaches the upper level limit, or which is closed by the pressure sensitive valve when the tank pressure becomes excessive.

It is an object of the present invention to provide an improved tank fueling system, including liquid level and tank pressure and control valves with means to precheck the system both as to liquid level control and pressure control.

It is another object of the invention to provide an improved means for prechecking a pressure sensitive valve for use within a liquid containing tank.

It is still another object of the invention to provide a precheck means for a pressure sensitive valve within a tank containing liquid and which means has no moving parts.

It is a further object of the invention to provide a precheck means for a pressure sensitive and pressure actuated valve in which the use of a pressure relief valve is eliminated.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes:

FIG. 3 is an enlarged cross-sectional elevational view of a liquid level pilot valve and its actuating float;

FIG. 4 is a fragmentary cross-sectional plan view of the float, and its supporting structure, shown in FIG. 3;

FIG. 5 is a cross-sectional elevational view of a pressure sensitive valve in the system shown in FIG. 1; and FIG. 6 is a fragmentary cross-sectional view, taken as indicated by the line 6—6 in FIG. 5.

Figure 1:
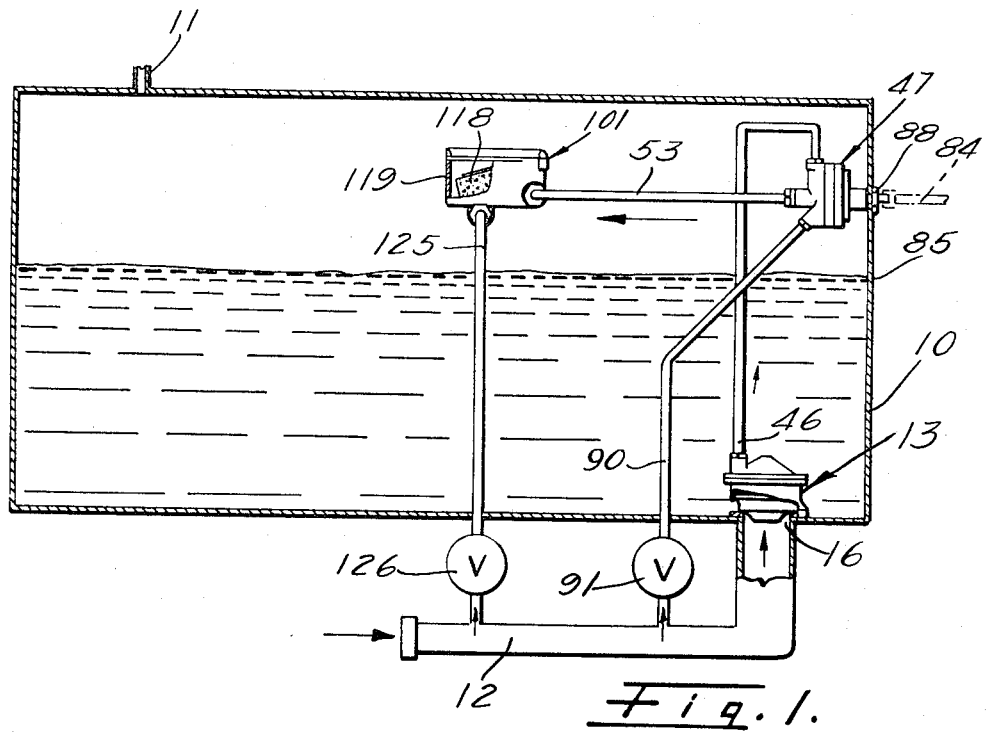
FIG. 1 is a diagrammatic view of a fueling system for one fuel tank.

Referring again to the drawings, there is shown in FIG. 1 a closed tank 10, representative of an aircraft fuel tank, and having a vent 11. The tank is filled from a main fueling line 12 and the fuel passes into the tank through the main fueling valve 13, secured to the tank bottom so as to be in register with an inlet opening 16.

Figure 2:
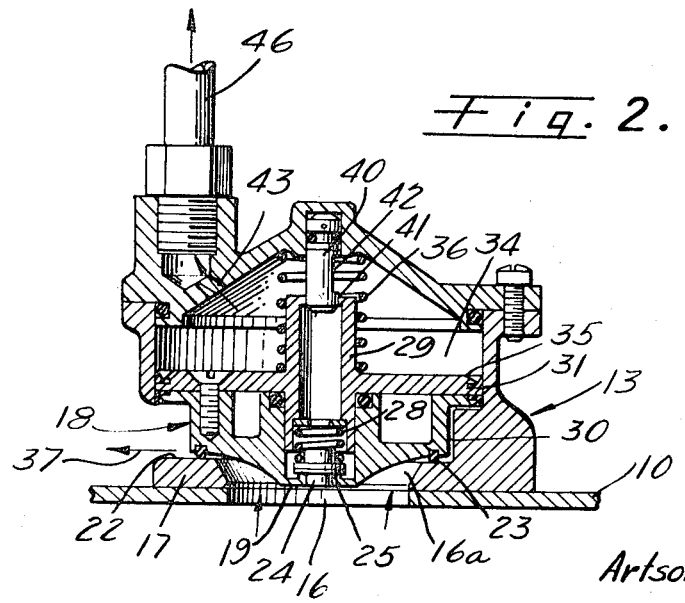
FIG. 2 is an enlarged cross-sectional view of the main fueling valve used in the system shown in FIG. 1.

As may be seen in FIG. 2, the main valve 13 has a base structure 17 fixed to the bottom of the tank and which has an inlet 16a, a continuation of the tank inlet 16. The main valve 13 has a normally closed operating valve member in the form of a piston, generally designated as 18. The piston has a lower end 19 and seats on a surface 22 of the base 17, the valve seal being formed by an annular elastomeric ring 23.

Centrally within the piston, with an opening at the lower end, extends a passage 24. The passage is shown closed by a check valve 25, biased in place by a spring 28. The passage continues upwardly beyond the piston proper within a tubular member 29.

The piston 18 has a lower cylindrical portion 30 and extending outwardly therefrom is an enlarged diameter portion 31, sealingly and slidably engaged in a valve chamber 34. The area of the piston at the seal 23 is smaller than that on an upper surface 35, adjacent the cylindrical portion 31, so that when the same pressure in pounds per square inch is exerted on both faces of the piston, the valve will be held closed in that a greater total force will be exerted upon the surface 35. The piston is held in its normally closed position by means of a spring 36. When the line pressure at the inlet 16 is greater than that of the force of the spring 36, the piston is moved upwardly within the chamber 34 and fuel is permitted to enter the tank through the opening, as indicated by the arrow 37, over the surface 22 and under the raised piston.

Fixed in the top of the valve 13 is a pin 40, having its lower end extending into the passage 24. At the lower end of the pin, there is a groove 41 which permits flow between the tubular member 29 and the pin when the piston is in the closed position, and when the piston is raised, the amount of flow is increased by means of a cutaway portion in the pin formed at the flat surface 42. Flow around the pin 40 fills the chamber 34 and then travels through orifice 43 into a flow diverting tube 46, connected to a pressure actuated valve, having a body generally designated as 47, shown in FIGS. 1 and 5.

The tube 46 is connected to an inlet 48 and when the pressure actuated valve 49 is open, as it is during normal fueling operation, fuel is permitted to flow out of an outlet 52 into a tube 53. The valve 49 has a seat 54 and when it is closed, it prevents flow out of the chamber 34 to cause the piston 18 to be closed by the line pressure.

The valve 49 has a stem 55 and a smaller diameter extension 58, the latter extending through two plate members 59 and 60, between which is secured an elastomeric diaphragm 61. The plate member 59 has a small diameter boss 64 which is slidably engaged in the cylindrical passage 65. A seal 66 is provided between the valve stem 55 and the boss 64 to seal passage 65 from diaphragm chamber 67. The diaphragm is held in place between the two plates by means of a nut 70 on the threaded end of the stem extension 58. The nut 70 is in abutment with a boss 71 on the plate 60, the latter boss being in slidable engagement with the wall of a cylindrical chamber 72, there being no seal between the boss and the wall.

The diaphragm is sealingly secured against the valve body portion 73 by means of a cap 74, the latter being held in place by cap screws 76. A second diaphragm chamber 77 is formed between the diaphragm and the cap 74.

The central portion of the diaphragm is held securely and thus, only the outer, annular U-shaped portion 78 is capable of flexing with the movement of the valve 49.

The valve 49 is held in a normally open position by means of a spring 79 which abuts the boss 71 within the cylindrical chamber 72 and abuts a screen 82 at its other end, the screen being positioned on a shoulder in the chamber 72 so as to extend over a passage 83 which is in communication with the diaphragm chamber 77. The passage 83 is in communication with the atmosphere by connection to a line 84, shown in FIG. 1. The line 84 is connected to passages 83 in other pressure sensitive valves 47 in other tanks of the aircraft so as to have one line to the atmosphere. The valve 47 is sealingly secured to a wall 85 of the tank by means of a nut 88.

As shown in FIGS. 1, 5 and 6, there is a flow diverting line 90 connected to the fuel supply line 12, the line 90 having a shutoff valve 91. As shown in FIG. 5, the line 90 is connected to a valve inlet 94, and extending from the inlet 94 is a small diameter passage formed of a conduit 95, a transverse substantially larger passage 96 and a conduit 97 which terminates in the chamber 67. The conduits 95 and 97 are of the same cylindrical configuration having equal diameters, and are in straight line alignment. The passage 96 extends through the valve body portion 73 so as to be open to both sides thereof to be in communication with the interior of the tank. A conduit 98, extending between the chamber 67 and the passage 96, is slightly larger than the conduits 95 and 97 and is at an angle to them and in the same plane so that flow through it will impinge upon flow from conduit 95 to conduit 97 within the passage 96.

Now referring to FIGS. 1, 3 and 4, the tube 53 connects the outlet from the pressure sensitive valve 47 to the inlet 100 of the float operated pilot valve body, generally designated as 101, and positioned in an upper zone of the tank so that a predetermined upper liquid level can act upon the float. The inlet 100 is connected by a passage 102 to a pilot valve chamber 103. The pilot valve chamber terminates at its lower end, shown in FIG. 3, in a valve outlet 104, surrounded by the pilot valve seat 107. Above the chamber is a cylindrical portion 108 in which the pilot valve stem 109 is slidably and sealingly engaged. Thus, all flow which enters chamber 103 is discharged through the outlet 104, around the pilot valve 112. The upper end of the stem 109 is pivotally secured, with a pin 113, to a float lever arm 114. The lever arm 114 is pivotally secured at one end at pivot 115 to the valve body 101, and its other end is secured to a float 118 so that when the float is raised by the liquid level in the tank, the pilot valve 112 is closed to shut off the flow through the tube 53 and the tube 46 whereby the line pressure entering the inlet 16 causes the valve piston 18 to close.

The float 118 is loosely positioned for upward and downward movement with a cup, generally designated as 119. The cup is covered with a metal plate 120 spaced in regard to the cup walls so as to permit the liquid in the tank to flow into the cup and to be in communication with the float. At the bottom of the cup, there is a small drain hole 121 which permits liquid to flow out of the cup as the level of the liquid in the tank is lowered relative to the cup.

Adjacent the drain hole 121 is a precheck inlet 124, and it is connected to a flow diverting tube 125, having its lower end joined to the fueling supply line 12. The tube 125 has a shutoff valve 126.

During normal fueling operation, the inlet pressure in the fuel supply line 12 may be approximately 60 pounds per square inch, but when a number of tanks, such as 10, are being filled at the same time this pressure will drop considerably. In the main valve embodiment shown in FIG. 2, the spring 36 exerts a force necessary to react a pressure of 20 pounds per square inch to hold the piston 18 in the closed position and thus, for fueling operation with this embodiment, the line pressure must be greater than 20 pounds per square inch to open the main valve piston 18. The spring 28 on the check valve 25 is relatively weak compared with the spring 36, and the check valve will open at a very low pressure. The purpose of the check valve is to prevent reverse flow out of the tank.

When the piston is opened by the line pressure, the liquid flows into the tank through the opening 37 and at the same time, liquid flows into the passage 24, through the chamber 34 into the diverting flow line 46, through the valve 47 into line 53, through the valve chamber 103, and out of the outlet 104 around the float operated pilot valve 112. When the liquid level in the tank rises so as to raise the float to the position shown in broken lines in FIG. 3, the valve 112 is closed so as to shut off the flow described immediately above. Thus, the flow into the passage 24 stops within the chamber 34 so as to act upon the piston surface 35 to cause the piston to be seated and stop the flow of fuel into the tank.

At all times, the pressure ambient to the pressure sensitive valve 49, that is, the pressure within the tank, is in communication with the diaphragm chamber 67 through the passage 96 and the conduits 97 and 98 so as to act upon the diaphragm. The diaphragm spring 79 exerts a force, in the embodiment shown, to react a pressure of 3 pounds per square inch on the diaphragm plate so as to hold the valve 49 in its normally open position. A pressure of approximately 3½ pounds per square inch within the diaphragm chamber 67 overcomes the force of the spring 79 so as to close the valve 49. When the valve 49 is closed flow stops in the line 46, and the pressure within the chamber 34 builds up so as to close the piston 18, stop the flow of fuel and the increase of pressure in the tank. Thus, if the vent 11 on the tank becomes plugged or the vent valve fails closed, the pressure within the diaphragm chamber 67 will act upon the diaphragm to close the valve 49 to prevent the bursting of the tank walls.

As a pressure actuated valve, as 49, cannot be inspected or checked by normal means when it is within the tank in order to ascertain that it is operable, as it must be for safety, it is highly desirable that the valve 49 be prechecked by means operable externally of the tank. This is done according to the present invention. To precheck the pressure sensitive valve, the valve 91 is opened at the start of the fueling operation. This permits a liquid pressure of about 20 pounds per square inch to flow into the tube 90. The liquid flows into the conduit 95 and out of the latter into the substantially larger transverse passage 96 in a cylindrical stream of the same shape and size that it acquired in the conduit 95 and thus, flows directly into the conduit 97 without change of shape or interruption of flow. This flow quickly fills the diaphragm chamber 67 and when the pressure is 3½ pounds per square inch, the diaphragm is actuated to close the valve 49. The closure of the valve 49 causes a pressure build up in the line 46 and the chamber 34 to close the main valve piston 18. This indicates that the pressure sensitive valve is operative. In an aircraft, for example, there is an indicating light in the cockpit to show that the main valve has closed in prechecking operations, as well as in regular fueling operations. When the prechecking is completed, the valve 91 is closed.

During the prechecking of the pressure sensitive valve 49, as soon as the chamber 67 is filled, flow starts into the conduit 98 and thereby into the transverse passage 96. The flow from the conduit 98 impinges upon the flow from conduit 95 to the conduit 97 and the conduit 98 performs to produce a spoiler. That is, it destroys the steady stream from conduit 95 to conduit 97 and causes a discharge out of both ends of the passage 96 as may be visualized in FIG. 6. The desirability for the spoiler is created by the fact that upon the closure of the main valve piston 18, the refueling pressure approaches its line pressure of approximately 60 pounds per square inch which causes the pressure in the line 90 to increase.

Under such a higher pressure, the spoiler effect also becomes stronger to cause greater interruption of the flow between conduits 95 and 97 and to cause a greater flow out of the passage 96 and into the tank. The result of this is that the pressure on the diaphragm is limited to a maximum of 10 pounds per square inch so that it is protected from the maximum operating pressure in the line and allows the system to function within the prescribed limits without the use of check valves or relief valves or other moving parts other than the fluid itself.

In the arrangement shown in FIG. 5, a minimum flow is permitted into the conduits 95 and 97 by having their diameters equal 1/16 of an inch. The diameter of the passage 96 is 3/16 of an inch and thus, it has a cross-sectional area of 9 times that of the conduits 95 and 97. To insure the proper flow out of the chamber 67 into the spoiler creating conduit 98, the diameter of the latter is made to be slightly larger than the diameters of conduits 95 and 97; that is, the diameter of conduit 98 is 0.076 of an inch.

The float operated pilot valve 112 may be prechecked at the start of fueling, either before or after the prechecking of the pressure sensitive valve 49. To precheck the pilot valve 112 and its float 118, the valve 126 is opened to permit line liquid to enter the tube 125 and this causes a flow of fluid through orifice 124 into the cup 119. The cup is quickly filled and the float, if operating, rises and causes the pilot valve 112 to be closed. This shuts off the flow to valve chamber 103, line 53, and line 46 so as to build up the pressure within the chamber 34 so as to close the main valve. Again, an indicating light in the cockpit indicates the closure of the main valve and the successful operation of the pilot valve 112 and its float 118. As soon as the prechecking is accomplished, the valve 126 is closed and the liquid in the cup 119 is permitted to flow out of the drain hole 121 and this permits the float 118 to be lowered, causing the valve 112 to be opened, as shown in FIG. 3. The hole 121 is made slightly smaller than the orifice 124 so as to insure that the cup 119 fills faster than it drains through the former. However, since the pressure entering through orifice 124 is substantial, the cup is easily filled much faster than it is drained through the hole 121.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific form shown or uses mentioned except as defined in the accompanying claims, wherein various portions have been separated for clarity of reading and not for emphasis.

I claim:
1. In a pressure sensitive valve having a paycheck means,
   (a) a valve body;
   (b) a chamber in said body;
   (c) a diaphragm dividing said chamber into two parts;
   (d) a valve having a stem extending through one of said parts and being connected to move with said diaphragm,
   (e) said one part being closed.
   (f) said diaphragm being spring biased to hold said valve in an open position;
   (g) first passage means to said one part to communicate pressure to be sensed to said diaphragm whereby a predetermined pressure will actuate said diaphragm to move said valve to a closed position;
   (h) the improvement comprising precheck means in communication with said first passage means to precheck the operation of said diaphragm and valve, said precheck means including:
   (i) said first passage means having a liquid pressure source to supply liquid under pressure to said one part through said first passage means to actuate said diaphragm and valve at said predetermined pressure; and
   (j) second passage means in communication with said one part and said first passage means to carry liquid to interrupt the flow of liquid in said first passage means flowing into said one part when the latter is filled which liquid and the diaphragm has been actuated,
   (k) said second passage means and said first passage means having discharge means adjacent where said flow of liquid is interupted.

2. The invention according to claim 1 in which: said discharge means includes an enlarged passage in which said first passages means extends and in which said flow of liquid is interrupted.

3. The invention according to claim 2 in which: said discharge means is a passage having an opening extending to the outer surface of said valve body.

4. The invention according to claim 2 in which:
   (a) said discharge means is a passage having an opening extending to the outer surface of said valve body,
   (b) said discharge means joins said second passage means at an angle and so as to be relatively transverse to the flow directions of said first and second passage means,
   (c) said first and second passage means being directed with respect to said discharge means so that flow through said second passage mean is directed to impinge upon the flow through said first passage means to cause said interruption of flow.

5. The invention according to claim 4 in which:
   (a) said first passage means is formed of a first tubular-shaped bore extending between said one part and said discharge means, a second tubular-shaped bore extending from said liquid pressure source to said discharge means, and a flow path through said discharge means between said first and second tubular-shaped bore,
   (b) said first tubular-shaped bore, said second tubular-shaped bore and said last flow path being in a straight line,
   (c) said first and second tubular-shaped bores having approximately the same cross-sectional areas and shape,
   (d) said second passage means being slightly larger in cross section than said first and second tubular-shaped bores and being substantially smaller than said discharge means.

6. The invention according to claim 5 in which: said discharge means has a cross-sectional area equal to nine times the cross-sectional area of said first and second tubular-shaped bores.

7. In a tank level and pressure control system in which liquid from a pressurized supply is fed into a tank,
   (a) a pilot valve operative to close in response to rise of the liquid content of the tank to a predetermined level at an upper zone in the tank;
   (b) a normally closed main valve for liquid flow therethrough into the tank to form a main liquid body in the tank,
   (c) said main valve being responsive to the pressure of the supply liquid to open when said pilot valve is open and being responsive to closing of said pilot valve to close in opposition to the liquid pressure when said predetermined liquid level is reached;
   (d) first and second means to divert portions of the supply liquid to said upper zone;
   (e) means to trap diverted liquid from said first means to divert in said upper zone to create a body of liquid at said predetermined level to close said pilot valve for closing action of the main valve to precheck the level control operativeness of the main valve and pilot valve before the main body of liquid reaches said predetermined level; and (f) the improvement comprising: a normally open, tank pressure sensitive valve connected to said main valve and said pilot valve by said second means to divert and being operative to close at a predetermined tank pressure, (g) said main valve being responsive to closing of said pressure sensitive valve to close in opposition to the liquid pressure when said predetermined tank pressure is reached.

8. The invention according to claim 7 including:
(a) means within said pressure sensitive valve and third means to divert supply liquid to said pressure sensitive valve to close said pressure sensitive valve for closing action of the main valve to precheck the operativeness of the pressure sensitive valve and main valve when the tank pressure has not reached said predetermined pressure.

9. The invention according to claim 8 in which:
(a) said main valve being responsive for opening and closing in relation to the opening and closing of the pilot valve, respectively, by means including said second means to divert which is a conduit connecting said main valve with said pressure sensitive valve and connecting said pressure sensitive valve with said pilot valve,
(b) said second means to divert being closed by the closing of said pressure sensitive valve.

10. The invention according to claim 7 in which said pressure sensitive valve is comprised of:
(a) a valve body;
(b) a chamber in said body;
(c) a diaphragm dividing said chamber into two parts
(d) said pressure sensitive valve having a stem extending through one of said parts and being connected to move with said diaphragm,
(e) said one part being closed,
(f) said diaphragm being spring biased to hold said pressure sensitive valve in an open position;
(g) first passage means to said one part to communicate liquid pressure to be sensed to said diaphragm, whereby said predetermined pressure will actuate said diaphragm to close said pressure sensitive valve;
(h) third means to divert a portion of the supply liquid connected to said first passage means;
(i) second passage means in communication with said one part and said first passage means to carry liquid to interrupt the flow of liquid in said first passage means flowing into said one part when the latter is filled with liquid and the diaphragm has been actuated to close said pressure sensitive valve for closing action of the main valve to precheck the operativeness of the pressure sensitive valve and main valve when the tank pressure has not reached said predetermined pressure.
(j) said first and second passage means being joined to a first conduit open to the tank, said joining being adjacent where said flow is interrupted.

11. The invention according to claim 10 in which:
(a) said first conduit includes an enlarged passage in which said first passage means extends and in which said flow of liquid is interrupted,
(b) said first conduit joins said second passage means at an angle and so as to be relatively transverse to the flow direction of said first and second passage means,
(c) said first and second passage means being directed with respect to said first conduit so that flow through said second passage means is directed to impinge upon the flow through said first passage means to cause said interruption of flow.

12. The invention according to claim 11 in which:
(a) said first passage means is formed of a first tubular-shaped bore extending between said one part and said first conduit, a second tubular-shaped bore extending from said third means to divert to said first conduit, and a flow path through said first conduit between said first and second tubular-shaped bores,
(b) said first tubular-shaped bore, said second tubular-shaped bore and said last flow path being in a straight line,
(c) said first and second tubular-shaped bores having approximately the same cross-sectional areas and shape,
(d) said second passage means being slightly larger in cross section than said first and second tubular-shaped bores and being substantially smaller than said first conduit.

13. The invention according to claim 12 in which: said first conduit has a cross-sectional area equal to nine times the cross-sectional area of said first and second tubular-shaped bores, the other of said parts in said valve body being open to the exterior of said tank.

References Cited
UNITED STATES PATENTS

| | | | |
|---|---|---|---|
| 2,780,237 | 2/1957 | Russell | 137—390 |
| 3,075,543 | 1/1963 | Holland | 137—390 |
| 3,269,404 | 8/1966 | LeBow | 137—413 X |

WILLIAM F. O'DEA, *Primary Examiner.*

D. R. MATTHEWS, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,732                                          September 24, 1968

Artson P. Hardison

It is certified that error appears in the above identified patent and that said Letters Patent are hereby corrected as shown below:

Column 5, line 55, "paycheck" should read -- precheck --.

Signed and sealed this 24th day of February 1970.

(SEAL)
Attest:

Edward M. Fletcher, Jr.                            WILLIAM E. SCHUYLER, JR.
Attesting Officer                                            Commissioner of Patents